(12) United States Patent
Houser et al.

(10) Patent No.: US 11,056,852 B2
(45) Date of Patent: Jul. 6, 2021

(54) CABLE PREPARATION MACHINE

(71) Applicant: TE CONNECTIVITY CORPORATION, Berwyn, PA (US)

(72) Inventors: Matthew Steven Houser, Hummelstown, PA (US); Michael Morris, Harrisburg, PA (US); Christopher John Gavlak, Mechanicsburg, PA (US); Gary Lee Deck, Bethel, PA (US)

(73) Assignee: TE Connectivity Services GmbH

( * ) Notice: Subject to any disclaimer, the term of this patent is extended or adjusted under 35 U.S.C. 154(b) by 201 days.

(21) Appl. No.: 16/122,138

(22) Filed: Sep. 5, 2018

(65) Prior Publication Data
US 2020/0076148 A1    Mar. 5, 2020

(51) Int. Cl.
*B23P 19/00* (2006.01)
*H01R 43/28* (2006.01)
*H02G 1/12* (2006.01)

(52) U.S. Cl.
CPC ............. *H01R 43/28* (2013.01); *H02G 1/127* (2013.01); *H02G 1/1265* (2013.01); *H02G 1/1297* (2013.01); *Y10T 29/532* (2015.01)

(58) Field of Classification Search
USPC ... 29/745, 564.4, 566.1, 760, 761, 825, 828, 29/829
See application file for complete search history.

(56) References Cited

U.S. PATENT DOCUMENTS

| | | | |
|---|---|---|---|
| 3,541,896 A | 11/1970 | Watson | |
| 6,330,839 B1 | 12/2001 | Amrein | |
| 6,363,604 B1 | 4/2002 | Sakuma | |
| 6,659,140 B2 | 12/2003 | Yamakawa | |
| 9,520,700 B2 | 12/2016 | Stepan et al. | |
| 9,620,919 B2 | 4/2017 | Ishigure | |
| 10,256,612 B2 * | 4/2019 | Houser | H02G 1/127 |
| 2018/0090918 A1 | 3/2018 | Houser et al. | |

FOREIGN PATENT DOCUMENTS

| | | |
|---|---|---|
| DE | 9422310 U1 | 2/2000 |
| DE | 4427389 C2 | 4/2000 |
| EP | 3125382 A1 | 2/2017 |
| KR | 20120025149 A | 3/2012 |
| WO | 2005046015 A1 | 5/2005 |

OTHER PUBLICATIONS

International Search Report, International Application No. PCT/IB2019/057201, International Filing Date, dated Aug. 27, 2019.

* cited by examiner

*Primary Examiner* — Thiem D Phan (57) ABSTRACT

A cable preparation machine includes a frame forming a cable cutting zone and having a cable opening along a cable axis at the cable cutting zone receiving an end of a cable. The cable preparation machine includes a pulley assembly rotatably coupled to the frame about the cable axis, a drive assembly operably coupled to the pulley assembly to rotate the pulley assembly about the cable axis, and a blade assembly operably coupled to the pulley assembly and rotated with the pulley assembly about the cable axis. The blade assembly is configured for cutting an insulator from the end of the cable in a first cutting configuration when the cable is positioned in the cable opening and the blade assembly is configured for cutting a cable braid from the end of the cable in a second cutting configuration when the cable is positioned in the cable opening.

19 Claims, 7 Drawing Sheets

CABLE PREPARATION MACHINE

BACKGROUND OF THE INVENTION

The subject matter herein relates generally to a cable preparation machine.

Cables are used in many applications. Typically, an end of the cable is prepared for termination to a terminal, contact, connector, circuit board or other component by exposing the conductor(s) of the cable. For example, with a coaxial or shielded cable, the cable typically includes a center conductor, an inner insulator, an outer conductor, such as in the form of a cable braid, and an outer insulator, such as a cable jacket. Cable preparation processes typically involve removal of the various layers of the cable for termination of the conductive layers to the component. For example, the outer insulator is striped to expose the cable braid, the cable braid is stripped to expose the inner insulator and the inner insulator is stripped to expose the inner conductor.

Conventional cable preparation processes require several different process steps and several different preparation machines to perform all of the preparation steps. For example, the cable is typically inserted into a first machine to remove the outer insulator. The cable is then removed from the first machine and inserted into a second machine to remove the cable braid. The cable is removed from the second machine and then inserted into a third machine, or back into the first machine, to remove the inner insulator. Different steps and different machines are used because different preparation operations on the same cable need different cutting blades and other considerations performed in independent machines. For example, because the cable braid is manufactured from a metal, braided material, as opposed to a soft, dielectric material, different blades in different machines are needed to cut the different layers. Conventional cable preparation processes are time-consuming and expensive.

A need remains for a cable preparation machine capable of removing insulator layers and braid shields in a cost effective and reliable manner.

BRIEF DESCRIPTION OF THE INVENTION

In one embodiment, a cable preparation machine is provided including a frame forming a cable cutting zone and having a cable opening along a cable axis at the cable cutting zone receiving an end of a cable. The cable preparation machine includes a pulley assembly rotatably coupled to the frame about the cable axis, a drive assembly operably coupled to the pulley assembly to rotate the pulley assembly about the cable axis, and a blade assembly operably coupled to the pulley assembly and rotated with the pulley assembly about the cable axis. The blade assembly is configured for cutting an insulator from the end of the cable in a first cutting configuration when the cable is positioned in the cable opening and the blade assembly is configured for cutting a cable braid from the end of the cable in a second cutting configuration when the cable is positioned in the cable opening.

In another embodiment, a cable preparation machine is provided including a frame forming a cable cutting zone and having a cable opening along a cable axis at the cable cutting zone receiving an end of a cable. The cable preparation machine includes a pulley assembly rotatably coupled to the frame about the cable axis. The cable preparation machine includes a blade assembly operably coupled to the pulley assembly having an insulation blade configured for cutting an insulator of the cable and a braid blade configured for cutting a cable braid of the cable. The cable preparation machine includes a drive assembly operably coupled to the pulley assembly to rotate the pulley assembly about the cable axis. The drive assembly rotates the pulley assembly in a first drive configuration to actuate the insulation blade for cutting the insulator of the cable. The drive assembly rotates the pulley assembly in a second drive configuration to actuate the braid blade for cutting the cable braid of the cable.

In a further embodiment, a cable preparation machine is provided including a frame forming a cable cutting zone and having a cable opening along a cable axis at the cable cutting zone receiving an end of a cable. The cable preparation machine includes a drive assembly having a first drive unit and a second drive unit. The cable preparation machine includes a pulley assembly rotatably coupled to the frame about the cable axis. The pulley assembly includes a front pulley operably coupled to the first drive unit and a rear pulley operably coupled to the second drive unit. The front pulley is rotatable in a forward direction and a reverse direction by the first drive unit. The rear pulley is rotatable in a forward direction and a reverse direction by the second drive unit independent of the rotation of the front pulley. The cable preparation machine includes a blade assembly operably coupled to the pulley assembly. The blade assembly has an insulation blade rotatably mounted to the front pulley and configured for cutting an insulator of the cable. The blade assembly has a braid blade rotatably coupled to the front pulley and configured for cutting a cable braid of the cable.

DETAILED DESCRIPTION OF THE INVENTION

Figure 1:
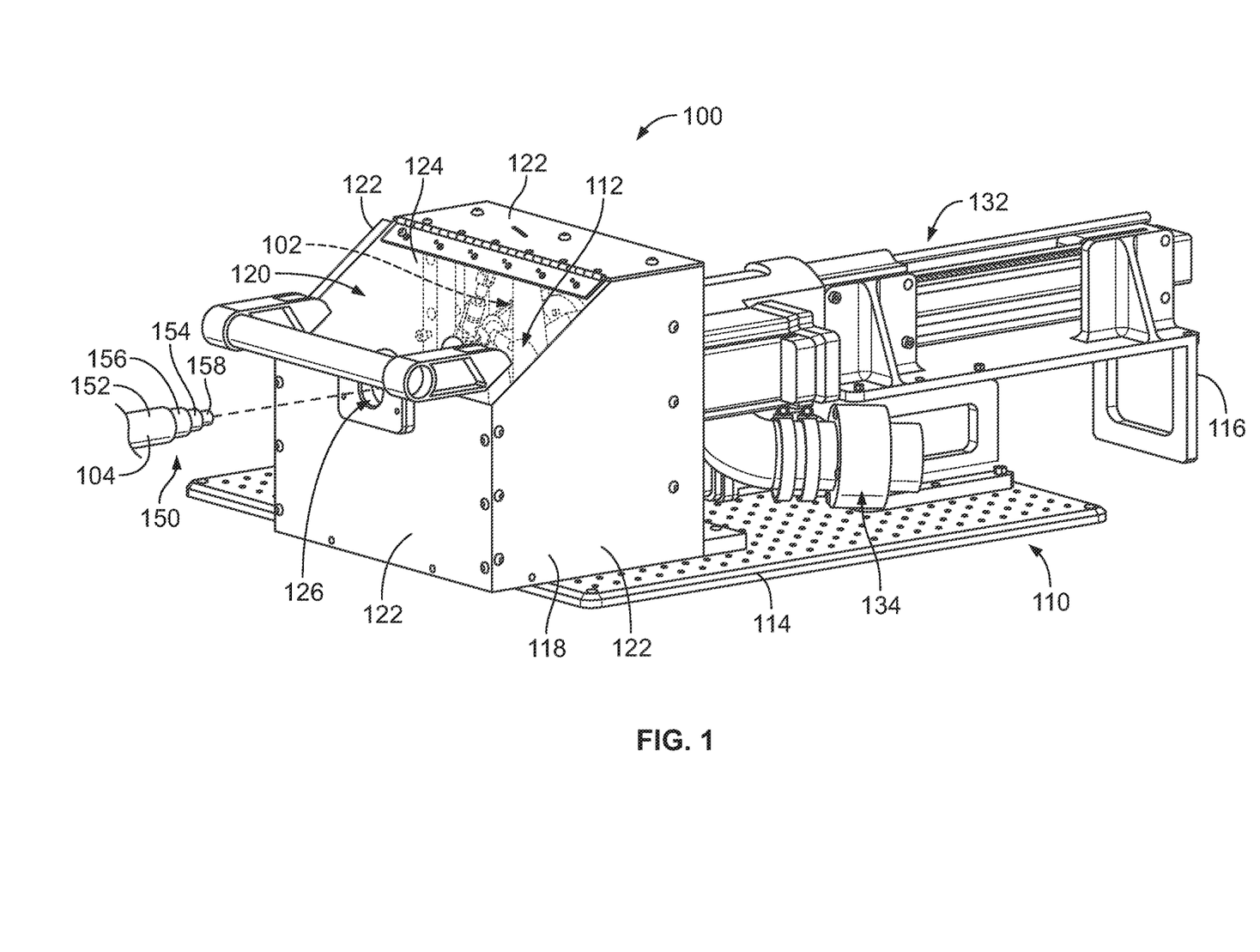
FIG. 1 illustrates a cable preparation machine in accordance with an exemplary embodiment.

FIG. 1 illustrates a cable preparation machine 100 in accordance with an exemplary embodiment. The cable preparation machine 100 includes a cable cutting device 102 configured to cut and remove one or more insulators from an end 150 of a cable 104, such as an outer insulator 152 (for example, a cable jacket) and/or an inner insulator 154, and configured to cut and remove a cable braid 156 from the end 150 of the cable 104. The inner insulator 154 separates the cable braid 156 from an inner conductor 158 of the cable 104. The cable braid 156 provides electrical shielding for the inner conductor 158. The inner conductor 158 may be a solid core wire or a stranded wire. Optionally, the cable preparation machine 100 may be configured to flare the cable braid 156. Optionally, the cable preparation machine 100 may be configured to fold the cable braid 156 at the end of the cable 104. The cable preparation machine 100 is able to prepare the end of the cable 104 without moving the cable 104 between different machines. For example, the cable cutting device 102 includes different cutting blades for cutting the insulator(s) 152, 154 and the cable braid 156 during different cable cutting steps within the cable preparation machine 100 without removing the cable 104 from the cable cutting zone of the cable cutting device 102. As such, the end of the cable 104 may be processed and prepared quickly and efficiently using a single machine.

The cable preparation machine 100 includes a frame 110 supporting the various components of the cable preparation machine 100. The frame 110 forms a cable cutting zone 112 where the end of the cable 104 is processed and prepared. For example, the cable cutting device 102 is located at the cable cutting zone 112. The frame 110 includes a base 114 and support members 116 mounted to the base 114. The support members 116 support various components of the cable preparation machine 100. In an exemplary embodiment, the frame 110 includes a cabinet 118 housing the cable cutting device 102 in a chamber 120 of the cabinet 118. The cabinet 118 surrounds the cable cutting device 102 to prevent injury to the operator of the cable preparation machine 100. The cabinet 118 includes one or more walls 122 surrounding the chamber 120. Optionally, the cabinet 118 includes a door 124 for accessing the chamber 120. In an exemplary embodiment, the cabinet 118 includes a cable opening 126 through one or more of the walls 122 to allow the cable 104 to be loaded into the chamber 120 to the cable cutting zone 112.

In an exemplary embodiment, the cable preparation machine 100 includes a cable holder 130 (shown in FIG. 7) in the cabinet 118 that holds the cable 104 during the cable preparation process. For example, the cable holder 130 holds the cable 104 in the cable cutting zone 112 for removal of the insulator(s) 152, 154 and the cable braid 156. Optionally, the cable holder 130 is movable relative to the frame 110 to position the cable 104 in the cable cutting zone 112.

In an exemplary embodiment, the cable preparation machine 100 includes a braid manipulation device 132 configured to flare the cable braid 156 during processing of the end of the cable 104 and/or configured to fold the cable braid 156 backwards during processing of the end of the cable 104. In the illustrated embodiment, the braid manipulation device 132 is located behind the cabinet 118.

Optionally, the cable preparation machine 100 may include a chute 134 for discarding the removed slugs of insulator(s) 152, 154 and/or the removed slugs of cable braid 156 after being cut and removed from the end of the cable 104. The chute 134 transfers the discarded slugs away from the cable cutting zone 112.

Figure 2:
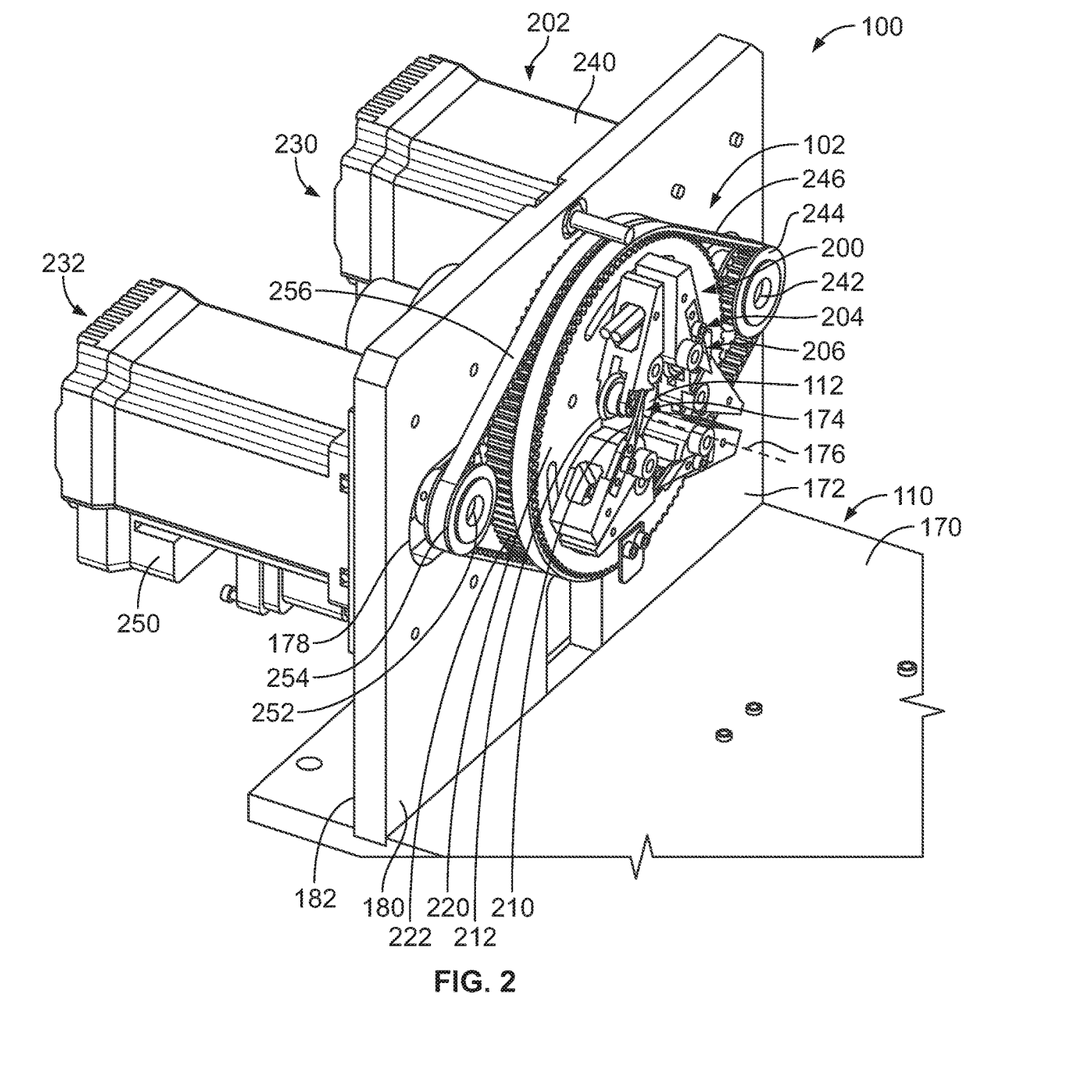
FIG. 2 is a perspective view of a portion of the cable preparation machine showing a cable cutting device in accordance with an exemplary embodiment.

FIG. 2 is a perspective view of a portion of the cable preparation machine 100 showing the cable cutting device 102 in accordance with an exemplary embodiment. FIG. 2 illustrates a base 170 and a support wall 172 of the frame 110 used to support the cable cutting device 102. The support wall 172 of the frame 110 includes a cable opening 174 along a cable axis 176 at the cable cutting zone 112 that receives the end 150 of the cable 104 (shown in FIG. 1).

The support wall 172 of the frame 110 includes drive openings 178 therethrough between a front 180 and a rear 182 of the support wall 172. The drive openings 178 may be located generally on opposite sides of the cable opening 174; however, other locations are possible in alternative embodiments, such as above and/or below the cable opening 174.

The cable cutting device 102 includes a pulley assembly 200, a drive assembly 202 and a blade assembly 204. The pulley assembly 200 is rotatably coupled to the support wall 172 of the frame 110 about the cable axis 176. The pulley assembly 200 is located forward of the front 180 of the support wall 172. The drive assembly 202 is operably coupled to the pulley assembly 200 to rotate the pulley assembly 200 about the cable axis 176. The blade assembly 204 is operably coupled to the pulley assembly 200 and is rotated with the pulley assembly 200 about the cable axis 176.

The blade assembly 204 is configured for cutting the insulator(s) 152, 154 from the end 150 of the cable 104 in a first cutting configuration of the cable cutting device 102 when the cable 104 is positioned in the cable opening 174. Optionally, the blade assembly 204 may be configured for removing the insulator slug that is removed from the cable 104, such as by holding the insulator slug in the cable opening 174 as the cable 104 is drawn forward in the cable opening 174 until the insulator slug falls off the end of the cable 104. The cable 104 may then be repositioned in the cable opening 174, such as for removal of the cable braid 156 or manipulation of the cable braid 156, such as flaring or folding of the cable braid 156.

The blade assembly 204 is configured for cutting the cable braid 156 from the end 150 of the cable 104 in a second cutting configuration of the cable cutting device 102 when the cable 104 is positioned in the cable opening 174. The drive assembly 202, the pulley assembly 200 and the blade assembly 204 are operated differently in the second cutting configuration than the first cutting configuration. Optionally, the blade assembly 204 may be configured for removing the cable braid slug that is removed from the cable 104, such as by holding the cable braid slug in the cable opening 174 as the cable 104 is drawn forward in the cable opening 174 until the cable braid slug falls off the end of the cable 104. The cable 104 may then be repositioned in the cable opening 174, such as for removal of the inner insulator 154 or manipulation of the cable braid 156.

In an exemplary embodiment, the blade assembly 204 includes multiple cutting blades 206 disposed about the cable axis 176. For example, the cutting blades 206 may triangulate the cable 104 within the cable opening 174 during the cutting operations to ensure that the cable 104 remains centered within the cable opening 174 for consistent cutting depth by the cutting blades 206. In an exemplary embodiment, the blade assembly 204 includes a plurality of insulation blades 210 configured for cutting the insulators 152, 154 of the cable 104. In an exemplary embodiment, the blade assembly 204 includes a plurality of braid blades 212 configured for cutting the cable braid 156 of the cable 104. The braid blades 212 are different than the insulation blades 210 for cutting the hard metal cable braid 156 as opposed to cutting the soft plastic insulators 152, 154. In the illustrated embodiment, the insulation blades 210 are fixed blades having a razor-like or a knife-like cutting edge for cutting the insulators 152, 154. In the illustrated embodiment, the braid blades 212 are roller blades that have circular cutting edges that spin during cutting of the cable braid 156. Other types of blades may be used for cutting the insulators 152, 154 and/or the cable braid 156 in alternative embodiments.

In an exemplary embodiment, the pulley assembly 200 includes a front pulley 220 operably coupled to a first drive unit 230 of the drive assembly 202 and a rear pulley 222 operably coupled to a second drive unit 232 of the drive assembly 202. The front pulley 220 is forward of the rear pulley 222 and both pulleys 220, 222 are located forward of the front 180 of the support wall 172 of the frame 110. The front pulley 220 is rotatable independent of and relative to the rear pulley 222. For example, the first drive unit 230 may be operated independently of the second drive unit 232. The first drive unit 230 may be operated to rotate the front pulley 220 in a forward direction and in a reverse direction. Similarly, the second drive unit 232 may be operated to rotate the rear pulley 222 in a forward direction and in a rearward direction. During operation, the front pulley 220 may be operated at a different rate than the rear pulley 222 or may be operated at the same rate as the rear pulley 222. In certain operations, the front pulley 220 and the rear pulley 222 may be operated in different directions. In certain operations, the front pulley 220 or the rear pulley 222 may remain stationary while the other of the front pulley 220 or the rear pulley 222 may be operated in a forward direction or a rearward direction. When the front pulley 220 and the rear pulley 222 are operated at different speeds and/or in different directions, the pulley assembly 200 actuates the blade assembly 204, such as for opening or closing the cutting blades 206 around the cable 104. The cutting blades 206 are rotated with the pulley assembly 200 about the cable axis to circumscribe the cable 104 for cutting the cable 104.

In the illustrated embodiment, the first drive unit 230 of the drive assembly 202 includes a first drive motor 240, a first drive shaft 242, a first drive pulley 244 and a first drive belt 246 coupled to the front pulley 220. The drive motor 240 is located rearward of the support wall 172 and the drive pulley 244 is located forward of the support wall 172. The driveshaft 242 passes through the drive opening 178. The drive motor 240 rotates the driveshaft 242, which rotates the drive pulley 244. The drive motor 240 may be rotated in a forward direction or a reverse direction. As the drive pulley 244 is rotated, the drive belt 246 rotates the front pulley 220. In various embodiments, the drive motor 240 may be a stepper motor. In other various embodiments, the drive motor 240 may be a servo motor. Other types of drivers may be used in alternative embodiments, such as a hydraulic driver, a pneumatic driver, or another type of drive unit. Other types of drive systems may be used in alternative embodiments. For example, rather than using the drive belt 246, the drive pulley 244 may define a drive gear directly engaging the front pulley 220.

In the illustrated embodiment, the second drive unit 232 of the drive assembly 202 includes a second drive motor 250, a second drive shaft 252, a second drive pulley 254 and a second drive belt 256 coupled to the rear pulley 222. The drive motor 250 is located rearward of the support wall 172 and the drive pulley 254 is located forward of the support wall 172. The driveshaft 252 passes through the drive opening 178. The drive motor 250 rotates the driveshaft 252, which rotates the drive pulley 254. The drive motor 250 may be rotated in a forward direction or a reverse direction. As the drive pulley 254 is rotated, the drive belt 256 rotates the front pulley 220. In various embodiments, the drive motor 250 may be a stepper motor. In other various embodiments, the drive motor 250 may be a servo motor. Other types of drivers may be used in alternative embodiments, such as a hydraulic driver, a pneumatic driver, or another type of drive unit. Other types of drive systems may be used in alternative embodiments. For example, rather than using the drive belt 256, the drive pulley 254 may define a drive gear directly engaging the front pulley 220.

The drive assembly 202 is operated to rotate the pulley assembly 200 about the cable axis 176. The drive assembly 202 rotates the pulley assembly 200 in a first drive configuration to actuate the insulation blades 210, such as to open or close the insulation blades 210 relative to the cable 104. The first drive configuration is used for cutting the outer insulator 152 or the inner insulator 154 of the cable 104. In an exemplary embodiment, when the drive assembly 202 is operated in the first drive configuration, the blade assembly 204 is operated in the first cutting configuration. The drive assembly 202 rotates the pulley assembly 200 in a second drive configuration to actuate the braid blades 212, such as to open or close the braid blades 212 relative to the cable 104. The second drive configuration is used for cutting the cable braid 156 of the cable 104. In an exemplary embodiment, when the drive assembly 202 is operated in the second drive configuration, the blade assembly 204 is operated in the second cutting configuration. The insulation blades 210 and the braid blades 212 are rotatable with the pulley assembly 200 around the same cable axis 176.

Figure 3:
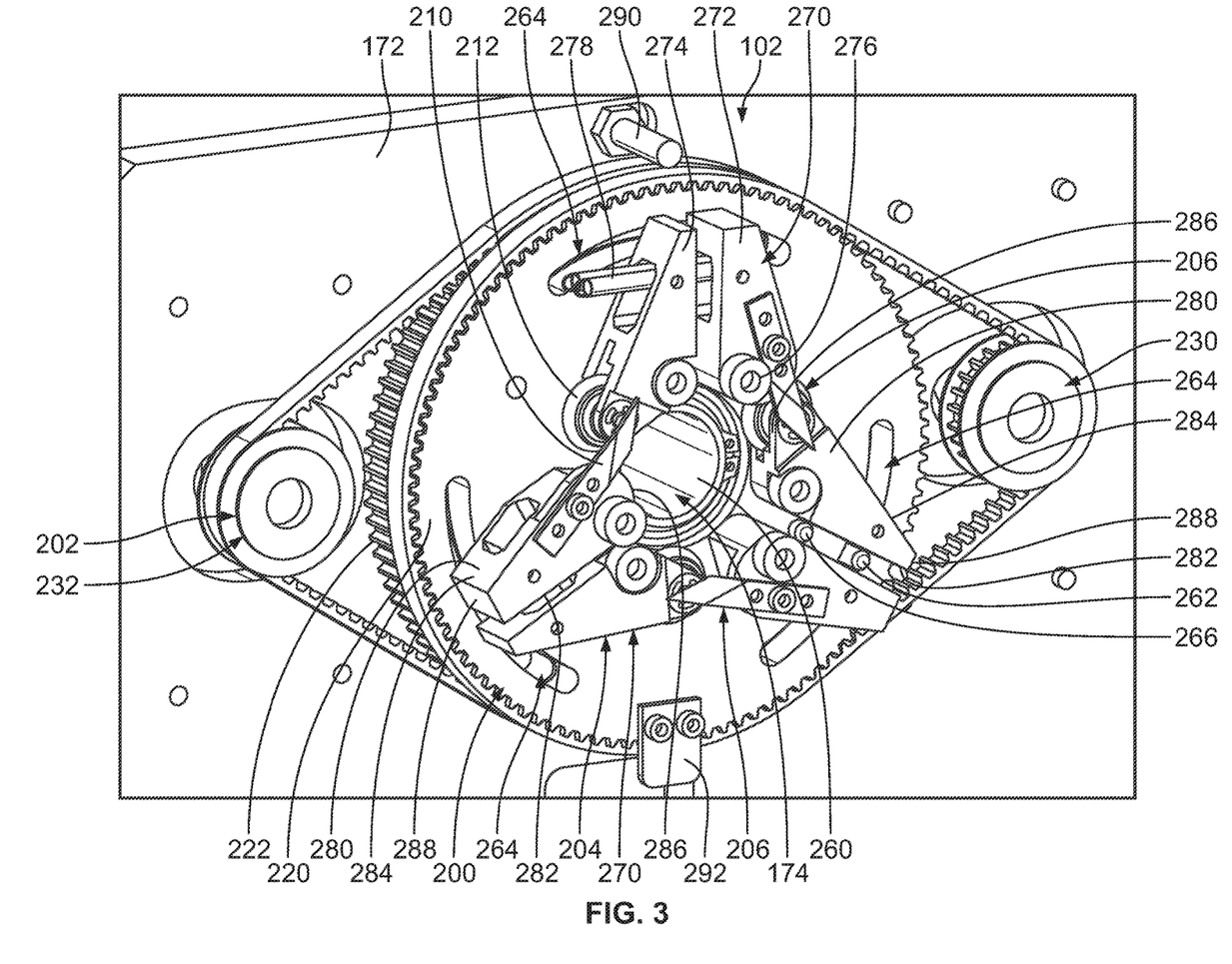
FIG. 3 is a front perspective view of the cable cutting device in accordance with an exemplary embodiment.
Figure 4:
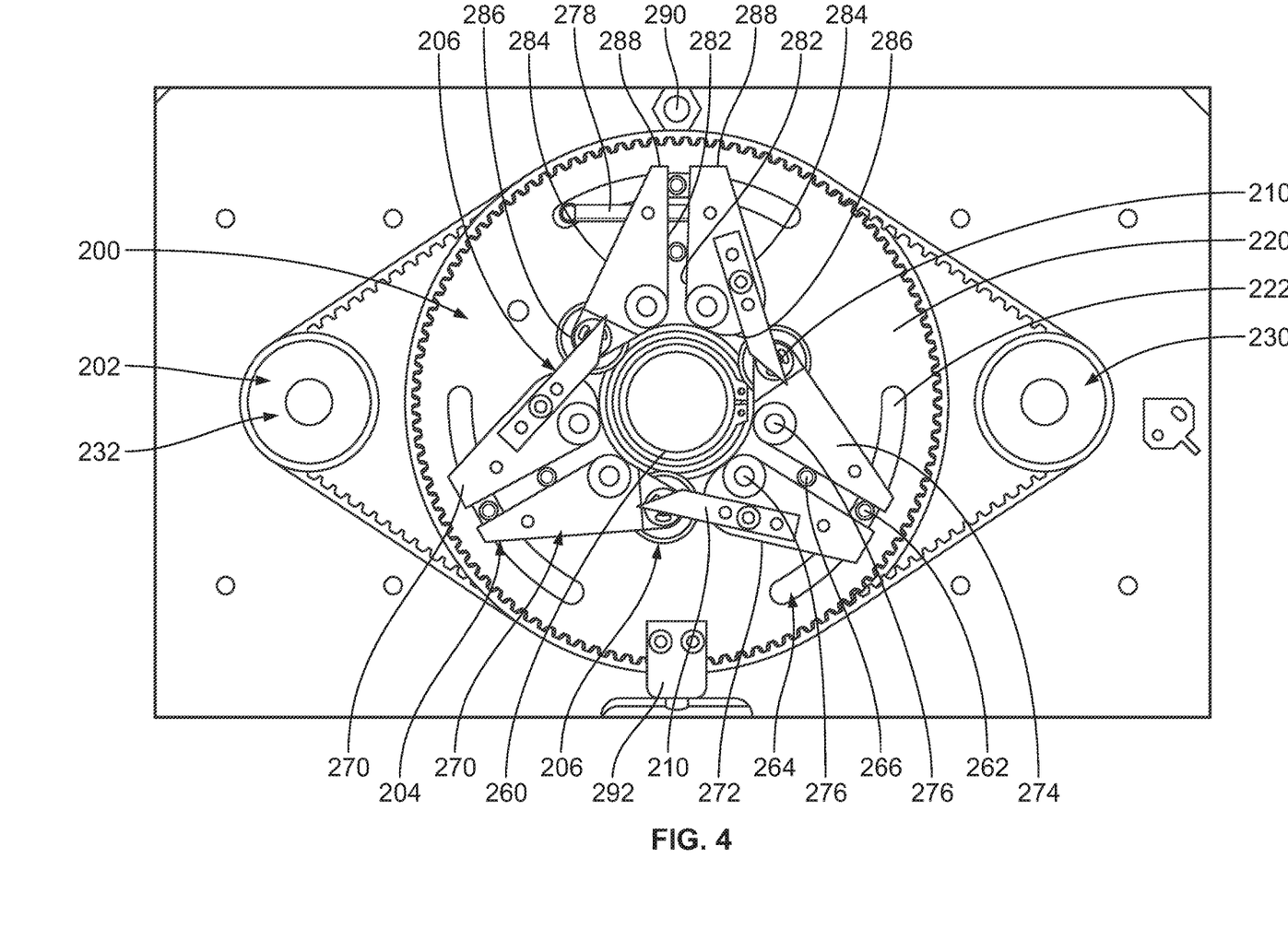
FIG. 4 is a front view of the cable cutting device in accordance with an exemplary embodiment.

FIG. 3 is a front perspective view of the cable cutting device 102 in accordance with an exemplary embodiment. FIG. 4 is a front view of the cable cutting device 102 in accordance with an exemplary embodiment. The pulley assembly 200 includes a hub 260 received in the cable opening 174 of the support wall 172. The hub 260 is hollow and configured to receive the end 150 of the cable 104 (shown in FIG. 1). The front pulley 220 and the rear pulley 222 are rotatable on the hub 260.

The rear pulley 222 includes arm actuation pins 262 extending forward from the rear pulley 222 into slots 264 in the front pulley 220. The arm actuation pins 262 extend through the front pulley 220 to engage the blade assembly 204. The arm actuation pins 262 actuate the blade assembly 204 during operation of the cable cutting device 102. For example, as the front pulley 220 rotates relative to the rear pulley 222, the arm actuation pin 262 engages the blade assembly 204 to actuate the blade assembly 204. In various embodiments, when the front pulley 220 rotates faster than the rear pulley 222, the blade assembly 204 is operated in the second cutting configuration such that the braid blades 212 are actuated. Conversely, when the rear pulley 222 rotates faster than the front pulley 220, the blade assembly 204 is operated in the first cutting configuration such that the insulation blades 210 are actuated.

In an exemplary embodiment, the pulley assembly 200 has a normal position wherein the front pulley 220 is rotationally centered with respect to the rear pulley 222. The front pulley 220 may include hard stop pins 266 extending forward of the front pulley 220 that engage the blade assembly 204 to position the blade assembly 204 in the normal position. The pulley assembly 200 may be operated to advance the insulation blades 210 from the normal position or may be operated to advance the braid blades 212 from the normal position. For example, relative rotation of the front pulley 220 with respect to the rear pulley 222 may cause the insulation blades 210 to advance or may cause the braid blades 212 to advance. The pulley assembly 200 may be operated to retract the insulation blades 210 to the normal position or may be operated to retract the braid blades 212 to the normal position. For example, relative rotation of the front pulley 220 with respect to the rear pulley 222 may cause the insulation blades 210 to retract or may cause the braid blades 212 to retract.

The blade assembly 204 includes arms 270 holding the cutting blades 206. The arms 270 are pivotably coupled to the front pulley 220 of the pulley assembly 200. The arms 270 pivot relative to the front pulley 220 to open or close the corresponding cutting blades 206. In the illustrated embodiment, the arms 270 are arranged in sets, each set including a first arm 272 and a second arm 274. The first arm 272 holds the corresponding insulation blades 210 for cutting the insulators 152, 154 and the second arm 274 holds the corresponding braid blade 212 for cutting the cable braid 156. In the illustrated embodiment, the blade assembly 204 includes three sets of the arms 270 with each set of arms 270 holding the corresponding insulation blade 210 and the corresponding braid blade 212. For example, the blade assembly 204 includes three of the first arms 272 holding the insulation blades 210 and includes three of the second arms 274 holding the braid blades 212. The three sets of arms 272, 274 triangulate the cutting blades 206 around the cable opening 174. Greater or fewer sets of arms 272, 274 may be provided in alternative embodiments. In other alternative embodiments, rather than sets of arms 272, 274, the blade assembly 204 may be provided with single arms 270 that each holds an insulation blade 210 and a braid blade 212. Forward rotation of such arms 270 may actuate the insulation blade 210 for cutting the insulators 152, 154, whereas rearward rotation of such arms 270 may actuate the braid blade 212 for cutting the cable braid 212.

The arms 270 are pivotably coupled to the front pulley 220 by an arm pivot pin 276. The arms 270 are pivoted relative to the front pulley 220 of the pulley assembly 200 to change a cutting depth of the corresponding cutting blade 206 (for example, the insulation blade 210 or the braid blade 212). For example, the relative movement (for example, angular position) of the front pulley 220 relative to the rear pulley 222 determines the amount of pivot of the arm 270, and thus the location of the cutting blade 206 relative to the cable opening 174 to control the cutting depth of the cutting blade 206. The cable cutting device 102 may accommodate cables 104 of the various diameters by changing the cutting depth of the cutting blades 206. In an exemplary embodiment, the arm pivot pin 276 is offset from the arm actuation pin 262. When the arm actuation pin 262 engages and drives against the arm 270, the arm 270 is pivoted about the arm pivot pin 276 to close the cutting blade 206 for cutting the cable 104.

The arm actuation pin 262 causes the arm 270 to pivot when the front pulley 220 is rotated at a different rate than the rear pulley 222. For example, in a first drive configuration, the front pulley 220 is rotated at a faster rate than the rear pulley 222 to actuate the blade assembly 204. For example, depending on the location of the arm actuation pin 262 in the slot 264, the pulley assembly 200 may be used to advance the insulation blade 210 from the normal position for closing the insulation blade 210 on the cable 104 for cutting the insulator 152 or 154 or may be used to retract (for example, open) the braid blade 212 from a closed position back to the normal position in the first drive configuration. In a second drive configuration, the rear pulley 222 is rotated at a faster rate than the front pulley 220 to actuate the blade assembly 204. For example, depending on the location of the arm actuation pin 262 and the slot 264, the pulley assembly 200 may be used to advance the braid blade 212 from the normal position for closing the braid blade 212 on the cable 104 for cutting the cable braid 156 or may be used to retract (for example, open) the insulation blade 210 from a closed position back to the normal position in the second drive configuration. In a third drive configuration, the front pulley 220 and the rear pulley 222 are rotated at the same rate. In the third drive configuration, the arm 270 remains stationary relative to the front pulley 220 and thus does not open or close when the front pulley 220 is rotated at the same speed as the rear pulley 222. The cutting blade 206 may be held at a constant cutting depth and rotated with the front pulley 220 when the front pulley 220 and the rear pulley 222 are rotated at the same speed.

In an exemplary embodiment, each arm 270 is coupled to an arm return spring 278. The arm return spring 278 biases the arm 270 to an open position. As the arm actuation pin 262 is retracted, the arm return spring 278 opens or returns the arm 270 to the normal position against the hard stop pin 266. The hard stop pin 266 holds the arm 270 in the normal position. The arm return spring 278 returns the arm 270 to a position where the arm 270 engages the hard stop pin 266, defining the normal position. The arm 270 is unable to open further than the normal position because the arm 270 bottoms out against the hard stop pin 266. In the illustrated embodiment, each set of arms 270 includes a corresponding arm return spring 278 coupled between the first arm 272 and the second arm 274 of the set of arms.

In operation, when the front pulley 220 is rotated in a first direction, the arm actuation pin 262 presses against the first arm 272 to actuate the first arm 272 and close the insulation blades 210 around the cable 104. The hard stop pins 266 hold the second arms 274 in the normal position. The arm return spring 278 is stretched as the first arm 272 pivots away from the second arm 274. When the front pulley 220 is rotated in an opposite second direction, the arm actuation pin 262 moves back toward the second arm 274 and the arm return spring 278 returns the first arm 272 to the normal position where the first arm 272 abuts against the hard stop pin 266. Further rotation of the front pulley 220 in the second direction causes the arm actuation pin 262 to press against the second arm 274 to actuate the second arm 274 and close the braid blades 212 around the cable 104. The hard stop pins 266 hold the first arms 272 in the normal position. The arm return spring 278 is stretched as the second arm 274 pivots away from the first arm 272. When the front pulley 220 is rotated in the opposite first direction, the arm actuation pin 262 moves back toward the first arm 272 and the arm return spring 278 returns the second arm 274 to the normal position where the second arm 274 abuts against the hard stop pin 266.

In an exemplary embodiment, each arm 270 includes a body 280 extending between a first side 282 and a second side 284. The body 280 extends between an inner end 286 and an outer end 288. The first sides 282 of the first and second arms 272, 274 face each other. The first sides 282 face the hard stop pins 266 and the arm actuation pins 262. In the normal positions, the first sides 282 abut against the hard stop pins 266. In the illustrated embodiment, the arm pivot pin 276 is located proximate to the first side 282 and proximate to the inner end 286. Other locations are possible in alternative embodiments. In the illustrated embodiment, the arm return spring 278 is located proximate to the outer end 288. Other locations are possible in alternative embodiments. The arm return springs 278 may be coupled to the front pulley 220 rather than between the arms 270 in alternative embodiments. In the illustrated embodiment, the arm actuation pin 262 engages the first sides 282 of the first and second arms 272, 274 proximate to the outer ends 288. Other locations are possible in alternative embodiments. In the illustrated embodiment, the insulation blade 210 is mounted to the first arm 272 proximate to the second side 284 at the inner end 286. The insulation blade 210 extends inward from the inner end 286. When the first arm 272 is pivoted, the cutting edge of the insulation blade 210 is closed inward toward the cable opening 174 to engage and cut the cable 104. In the illustrated embodiment, the braid blade 212 is mounted to the second arm 274 proximate to the second side 284 at the inner end 286. The braid blade 212 extends inward from the inner end 286. When the second arm 274 is pivoted, the cutting edge of the braid blade 212 is closed inward toward the cable opening 174 to engage and cut the cable 104.

In an alternative embodiment, rather than having first and second arms 272, 274, the blade assembly 204 may include single arms 270 each holding one of the insulation blades 210 and one of the braid blades 212. For example, rather than having the arms 270 split down the middle at the location of the hard stop pins 266 and the arm actuation pins 262, the first and second arms 272, 274 may be part of a single unitary body having a pocket or opening that receives the arm actuation pin 262. When the single arm is pivoted in the first direction, the insulation blade 210 is moved closer to the cable opening 174 to close the insulation blade 210 on the cable 104 and the braid blade 212 is moved further from the cable opening 174. When the single arm is pivoted in the second direction, the braid blade 212 is moved closer to the cable opening 174 to close the braid blade 212 on the cable 104 and the insulation blade 210 is moved further from the cable opening 174.

In an exemplary embodiment, the drive assembly 202 includes a position sensor assembly for sensing a rotational position of the pulley assembly 200. For example, the position sensor assembly includes a fixed position sensor 290 and a rotating position sensor 292. In the illustrated embodiment, the rotating position sensor 292 is fixed to the front pulley 220 and rotates relative to the fixed position sensor 290 with the front pulley 220. The fixed position sensor 290 senses a rotational position of the front pulley 220 based on the location of the rotating position sensor 292. For example, the fixed position sensor 290 may be a proximity sensor. Optionally, the rear pulley 222 may additionally or alternatively hold the rotating position sensor 292 to sense a position of the rear pulley 222. Other types of position sensors may be used to determine the rotational positions of the front pulley 220 and/or the rear pulley 222. In other various embodiments, the drive motors 240, 250 may be servo motors having internal position sensors for determining rotational positions of the drive units 230, 232 to determine the corresponding rotational positions of the front and rear pulleys 220, 222.

Figure 5:
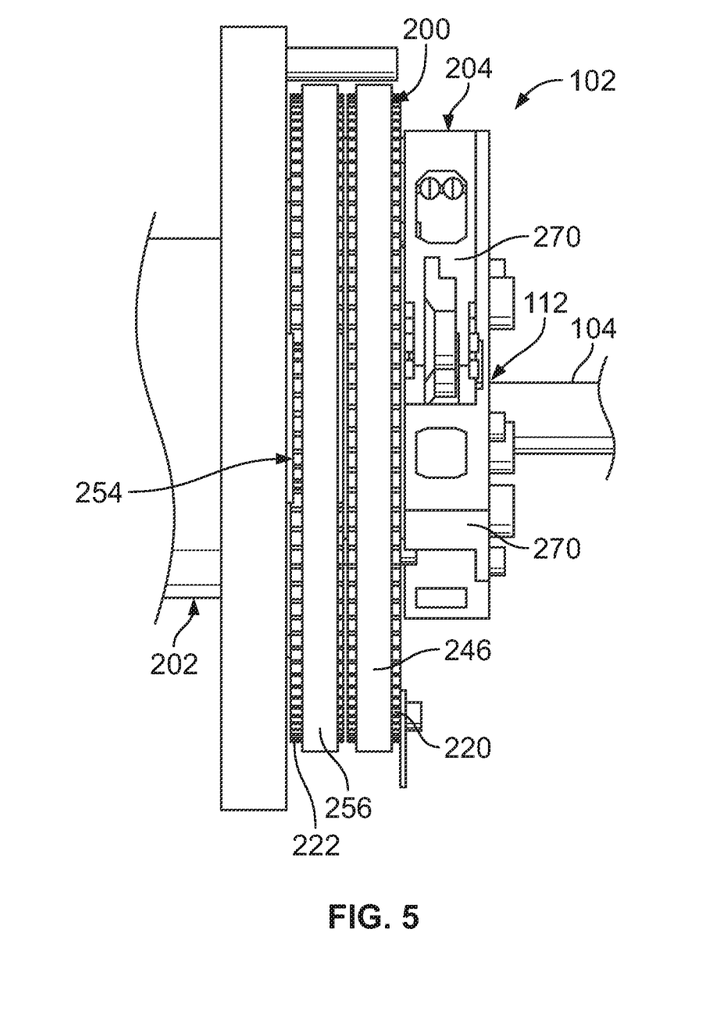
FIG. 5 is a side view of the cable cutting device in accordance with an exemplary embodiment.
Figure 6:
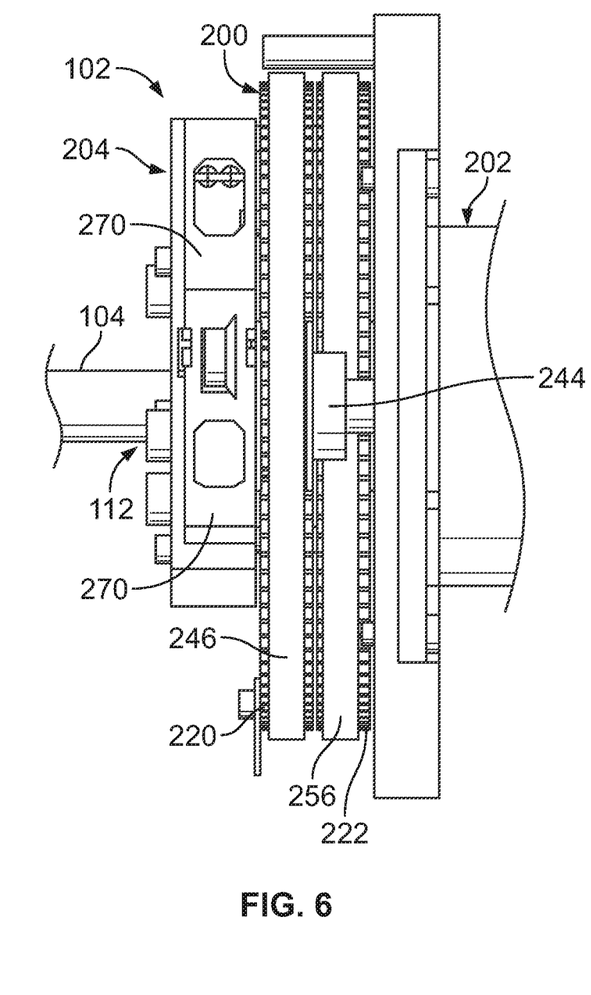
FIG. 6 is a side view of the cable cutting device in accordance with an exemplary embodiment.

FIG. 5 is a side view of the cable cutting device 102 illustrating the pulley assembly 200, a portion of the drive assembly 202 and the blade assembly 204. FIG. 6 is a side view of the cable cutting device 102 illustrating the pulley assembly 200, a portion of the drive assembly 202 and the blade assembly 204. FIG. 5 shows the second drive pulley 254 and the second drive belt 256 operably coupled to the rear pulley 222. FIG. 6 shows the first drive pulley 244 and the first drive belt 246 operably coupled to the front pulley 220. FIGS. 5 and 6 show the arms 270 of the blade assembly 204 coupled to the front of the front pulley 220. The cable 104 is illustrated extending into the cable cutting device 102.

The drive assembly 202 is operated to rotate the front pulley 220 and the rear pulley 222 to actuate the arms 270 of the blade assembly 204 in a first drive configuration to actuate the blade assembly 204 in a first cutting configuration for cutting the outer insulator 152 or the inner insulator 154 when the cable 104 is positioned in the cable opening 174. The drive assembly 202 is operated to rotate the front pulley 220 and the rear pulley 222 to actuate the arms 270 of the blade assembly 204 and a second drive configuration to actuate the blade assembly 204 in a second cutting configuration for cutting the cable braid 156 when the cable 104 is positioned in the cable opening 174. The cable 104 does not need to be removed from the cable cutting zone 112 in order to cut and remove the outer insulator 152, the cable braid 156 and the inner insulator 154. The different cutting operations may be performed by the single cable cutting device 102 without the need of removing the cable and inserting the cable into a different cable preparation machine.

Figure 7:
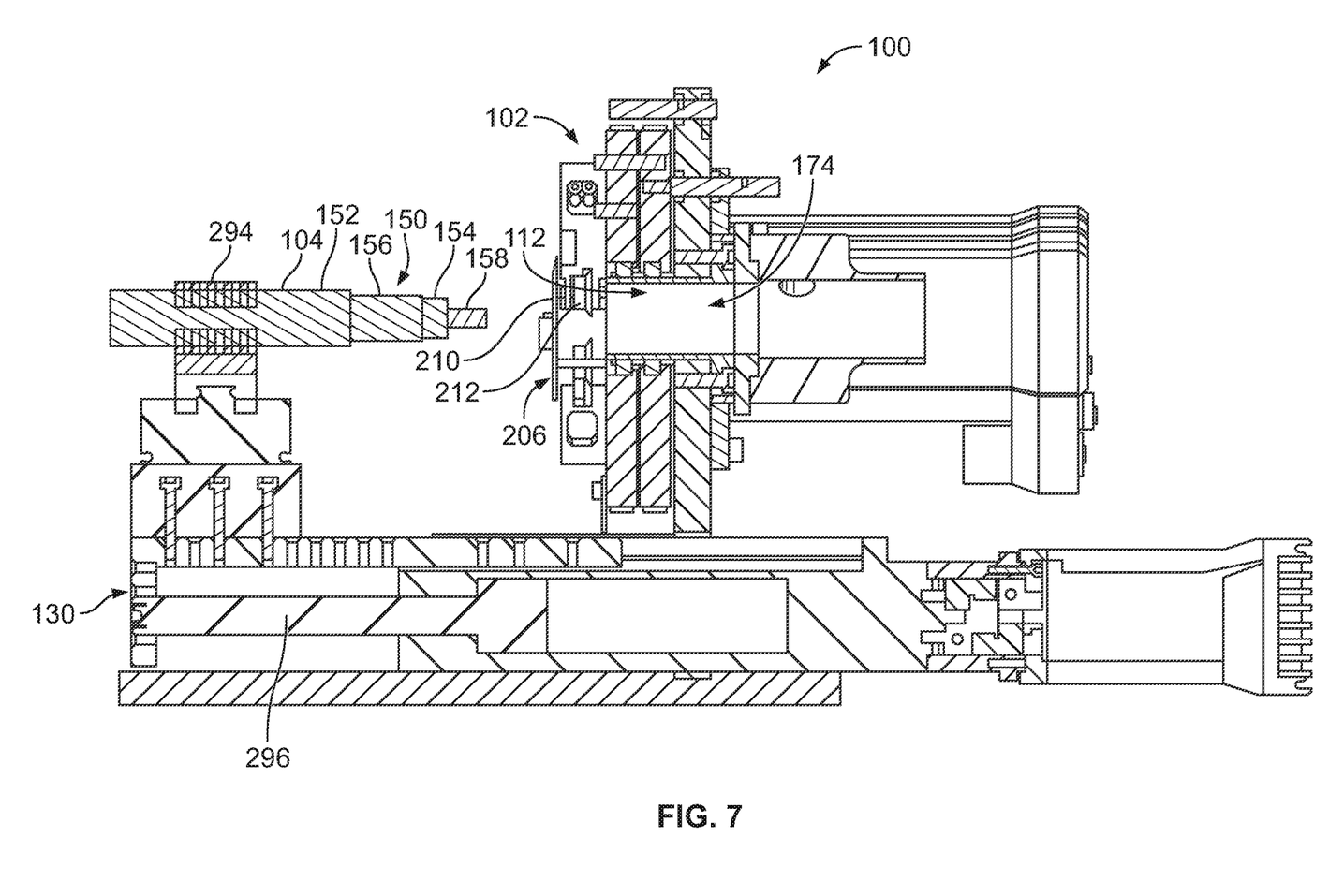
FIG. 7 is a partial sectional view of a portion of the cable preparation machine showing the cable cutting device and a cable holder in accordance with an exemplary embodiment.

FIG. 7 is a partial sectional view of a portion of the cable preparation machine 100 showing the cable cutting device 102 and the cable holder 130. The cable holder 130 includes a chuck 294 for holding the cable 104. The cable holder 130 includes a slide 296 from moving the chuck 294 toward and away from the cable cutting device 102. Once the cable 104 is secured in the chuck 294, the slide 296 moves the end 150 of the cable 104 into the cable opening 174 at the cable cutting zone 112. The cable cutting device 102 may be operated with the cable 104 remaining in the cable opening 174 to remove the various layers of the cable 104 to prepare the end of the cable 104. For example, the cable cutting device 102 is configured to remove a portion of the outer insulator 152, a portion of the cable braid 156 and a portion of the inner insulator 154 to expose the inner conductor 158 and to expose the cable braid 156 for termination of the cable 104 to another component. The cable cutting device 102 is able to remove each of the layers of the cable 104 without removing the cable 104 from the cable preparation machine 100. A single cable preparation machine 100 is able to perform multiple processing steps using the cable cutting device 102. Because the cable cutting device 102 includes two different types of the cutting blades 206, such as the insulation blades 210 and the braid blades 212, the cable cutting device 102 is able to process the cable 104 in a cost effective and reliable manner without the need for multiple machines or time-consuming transferring of the cable 104 between different machines.

Figure 8:
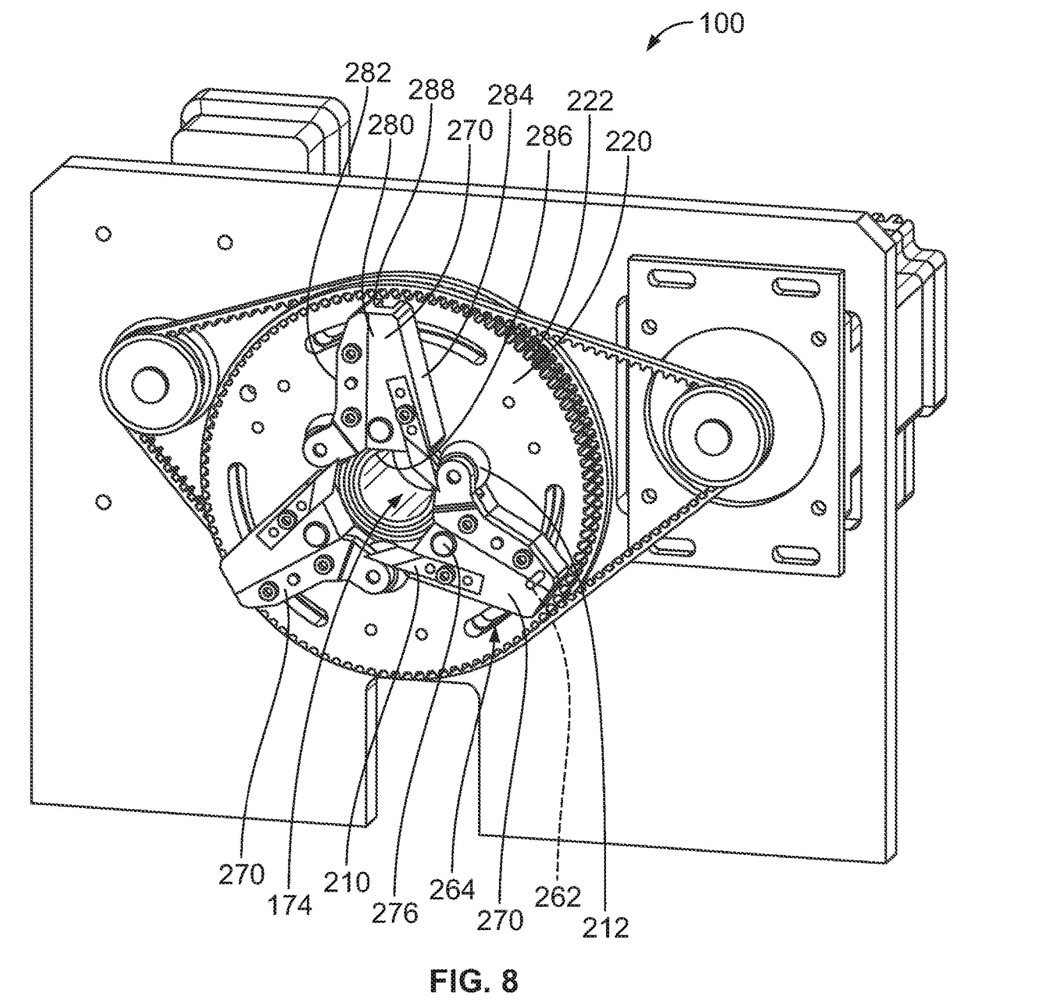
FIG. 8 is a front perspective view of the cable preparation machine in accordance with an exemplary embodiment.

FIG. 8 is a front perspective view of the cable preparation machine 100 in accordance with an exemplary embodiment showing the arms 270 as single arms each holding one of the insulation blades 210 and one of the braid blades 212. The arms 270 are in contrast to the sets of arms 272, 274 illustrated in FIGS. 3 and 4. Each arm 270 includes the body 280 extending between the first side 282 and the second side 284. The body 280 extends between the inner end 286 and the outer end 288.

Each arm 270 is pivotably coupled to the front pulley 220 by the arm pivot pin 276. Each arm 270 is configured to engage the arm actuation pin 262 (shown in phantom), such as approximately centered between the first and second sides 282, 284. The insulation blade 210 is mounted to the arm 270 proximate to the second side 284 at the inner end 286. The insulation blade 210 extends inward from the inner end 286. When the arm 270 is pivoted in a first direction, the cutting edge of the insulation blade 210 is closed inward toward the cable opening 174 to engage and cut the cable 104. When the arm 270 is pivoted in the first direction, the braid blade 212 is moved further from the cable opening 174. The braid blade 212 is mounted to the arm 270 proximate to the second side 284 at the inner end 286. The braid blade 212 extends inward from the inner end 286. When the second arm 274 is pivoted in a second direction, opposite the first direction, the cutting edge of the braid blade 212 is closed inward toward the cable opening 174 to engage and cut the cable 104. When the arm 270 is pivoted in the second direction, the insulation blade 210 is moved further from the cable opening 174. The relative movement between the front and rear pulleys 220, 222 causes the arms 270 to be pivoted. For example, the arm actuation pins 262 move in the slots 264 to pivot the arms 270 about the arm pivot pin 276.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A cable preparation machine comprising:
   a frame forming a cable cutting zone, the frame having a cable opening along a cable axis at the cable cutting zone receiving an end of a cable;
   a pulley assembly rotatably coupled to the frame about the cable axis;
   a drive assembly operably coupled to the pulley assembly to rotate the pulley assembly about the cable axis; and
   a blade assembly operably coupled to the pulley assembly and rotated with the pulley assembly about the cable axis, the blade assembly is configured for cutting an insulator from the end of the cable in a first cutting configuration when the cable is positioned in the cable opening and the blade assembly is configured for cutting a cable braid from the end of the cable in a second cutting configuration when the cable is positioned in the cable opening;
   wherein the pulley assembly rotates the blade assembly about the cable opening such that the blade assembly is configured to cut the insulator and cut the cable braid using different cutting blades of the blade assembly without removing the cable from the cable opening.

2. The cable preparation machine of claim 1, wherein the blade assembly includes an insulation blade actuated relative to the pulley assembly in the first cutting configuration to cut the insulator and the blade assembly includes a braid blade actuated relative to the pulley assembly in the second cutting configuration to cut the cable braid.

3. The cable preparation machine of claim 2, wherein the insulation blade and the braid blade are rotatable with the pulley assembly around the same cable axis.

4. The cable preparation machine of claim 1, wherein the blade assembly is movable relative to the pulley assembly to change a cutting depth of the blade assembly.

5. The cable preparation machine of claim 1, wherein the pulley assembly includes a front pulley and a rear pulley movable relative to each other by the drive assembly to actuate the blade assembly in the first cutting configuration and to actuate the blade assembly in the second cutting configuration.

6. The cable preparation machine of claim 5, wherein the front pulley is rotated faster than the rear pulley to actuate the blade assembly in the first cutting configuration and the front pulley is rotated slower than the rear pulley to actuate the blade assembly in the second cutting configuration.

7. The cable preparation machine of claim 5, wherein the blade assembly includes an arm holding at least one cutting blade, the front pulley includes a slot, the rear pulley including an arm actuation pin extending from the rear pulley through the slot of the front pulley to engage the arm of the blade assembly, the arm actuation pin causing the arm to pivot when the front pulley is rotated at a different rate than the rear pulley.

8. The cable preparation machine of claim 5, wherein the drive assembly includes a first drive unit operably coupled to the front pulley to rotate the front pulley and the drive assembly includes a second drive unit operably coupled to the rear pulley to rotate the rear pulley, the first drive unit being operated independent of the second drive unit to cause relative movement between the front pulley and the rear pulley.

9. The cable preparation machine of claim 8, wherein the drive assembly is operable in a first drive configuration such that the first drive unit rotates the front pulley at a faster rate than the second drive unit rotates the rear pulley to actuate an insulation blade of the blade assembly for cutting the insulator, and wherein the drive assembly is operable in a second drive configuration such that the second drive unit rotates the rear pulley at a faster rate than the first drive unit rotates the front pulley to actuate a braid blade of the blade assembly for cutting the cable braid, and wherein the drive assembly is operable in a third drive configuration such that the first drive unit and the second drive unit rotate the front pulley and the rear pulley at a same rate.

10. The cable preparation machine of claim 9, wherein the pulley assembly is configured to advance the insulation blade from a normal position in the first drive configuration and is configured to retract the braid blade to a normal position in the first drive configuration, the pulley assembly being configured to advance the braid blade from the normal position in the second drive configuration and is configured to retract the insulation blade to the normal position in the second drive configuration.

11. The cable preparation machine of claim 1, wherein the blade assembly includes a first arm pivotably coupled to the pulley assembly and a second arm pivotably coupled to the pulley assembly, the first arm holding an insulation blade for cutting the insulator, the second arm holding a braid blade for cutting the cable braid, the first arm being pivoted in the first cutting configuration to cut the insulator, the second arm being pivoted in the second cutting configuration to cut the cable braid.

12. The cable preparation machine of claim 11, wherein the blade assembly includes more than two first arms and corresponding insulation blades disposed about the cable axis and the blade assembly includes more than two second arms and corresponding braid blades disposed about the cable axis.

13. The cable preparation machine of claim 11, wherein the first arm is coupled to the second arm by an arm return spring biasing the first arm and the second arm toward each other.

14. The cable preparation machine of claim 11, wherein the insulation blade is a fixed blade fixed relative to the first arm for cutting the insulator, the braid blade being a roller blade spinning relative to the second arm for cutting the cable braid.

15. The cable preparation machine of claim 1, wherein the blade assembly includes an arm pivotably coupled to the pulley assembly, the arm holding an insulation blade at a first side of the arm for cutting the insulator, the arm holding a braid blade at a second side of the arm for cutting the cable braid, the blade assembly being pivoted in a first direction in the first cutting configuration to cut the insulator, the arm being pivoted and a second direction in the second cutting configuration to cut the cable braid.

16. The cable preparation machine of claim 1, wherein the blade assembly includes an insulation blade configured for cutting the insulator of the cable and a braid blade configured for cutting the cable braid of the cable, and wherein the drive assembly rotating the pulley assembly in a first drive configuration to actuate the insulation blade for cutting the insulator of the cable, the drive assembly rotating the pulley assembly in a second drive configuration to actuate the braid blade for cutting the cable braid of the cable.

17. The cable preparation machine of claim 16, wherein the pulley assembly rotates the blade assembly about the cable opening such that the insulator blade and the braid blade are configured to cut the insulator and the cable braid of the cable during the first drive configuration and the second drive configuration, respectively, without removing the cable from the cable opening.

18. The cable preparation machine of claim 1, wherein the drive assembly includes a first drive unit and a second drive unit, the pulley assembly including a front pulley operably coupled to the first drive unit and a rear pulley operably coupled to the second drive unit, the front pulley being rotatable in a forward direction and a reverse direction by the first drive unit, the rear pulley being rotatable in a forward direction and a reverse direction by the second drive unit independent of the rotation of the front pulley, the blade assembly having an insulation blade pivotably coupled to the front pulley and configured for cutting the insulator of the cable and a braid blade pivotably coupled to the front pulley and configured for cutting the cable braid of the cable.

19. The cable preparation machine of claim 18, wherein the pulley assembly rotates the blade assembly about the cable opening such that the insulator blade and the braid blade are configured to cut the insulator and the cable braid, respectively, without removing the cable from the cable opening.

* * * * *